United States Patent [19]

Lohmann

[11] Patent Number: 4,621,893

[45] Date of Patent: Nov. 11, 1986

[54] SATELLITE OPTICAL SCAN DEVICE

[75] Inventor: Gerd Lohmann, Bethesda, Md.

[73] Assignee: The United States of America as represented by the Secretary of the Army, Washington, D.C.

[21] Appl. No.: 735,015

[22] Filed: May 17, 1985

[51] Int. Cl.[4] ............................................. G02B 26/10
[52] U.S. Cl. ...................................................... 350/6.5
[58] Field of Search ............... 350/6.1, 6.5, 6.6, 540, 350/541; 114/340; 244/76 R

[56] References Cited

U.S. PATENT DOCUMENTS

| | | | |
|---|---|---|---|
| 978,368 | 12/1910 | Gruble | 114/340 |
| 3,572,883 | 3/1971 | Nordlund et al. | |
| 4,039,246 | 8/1977 | Voight | |
| 4,379,624 | 4/1983 | Miller et al. | 350/6.6 |

Primary Examiner—John K. Corbin
Assistant Examiner—Loha Ben
Attorney, Agent, or Firm—Saul Elbaum; Alan J. Kennedy; Anthony T. Lane

[57] ABSTRACT

An optical scan device for use in a satellite orbiting the earth. It comprises a platform rotating about an axis. A first periscope which has a longitudinal axis and first and second mirrors is attached to the platform such that the first mirror is positioned with its optical axis coincident with the axis of rotation of the platform. A second periscope which has a longitudinal axis and third and fourth mirrors is pivotally attached to the platform such that the second periscope is pivoted in line with the optical centers of the second mirror and the third mirror, and such that the third mirror is in optical communication with the second mirror. Means are provided for pivoting the second periscope through an angle of $a°$ as the platform rotates about its axis of rotation.

8 Claims, 5 Drawing Figures

NADAIR

SATELLITE OPTICAL SCAN DEVICE

RIGHTS OF THE GOVERNMENT

The invention described herein may be manufactured and used by or for the U.S. Government for government purposes without the payment to me of any royalty thereon.

BACKGROUND OF THE INVENTION

This invention relates to optical scanning systems for satellites orbiting the earth. The mechanism provides a conical scan pattern which is useful in meteorological satellite radiometer applications.

Prior art scanning systems use sliding contacts such as motor brushes, grounding brushes for electrostatic noise reduction, slip ring assemblies, and flexible cables. All of these components are undesirable because they add additional mechanical complexity to the device and produce electrical noise. This invention eliminates these problems while providing complete and independent freedom of two scan motions (angular tilt and rotary motion) that can be imparted without the use of slip rings or flexible cables.

SUMMARY OF THE INVENTION

This invention presents an optical scan device for use in a satellite orbiting the earth. In it a platform rotates about an axis. A first periscope which has a longitudinal axis and first and second mirrors is attached to the rotating platform such that the first mirror is positioned with its optical axis coincident with the axis of rotation of the platform. A second periscope which has a longitudinal axis and third and fourth mirrors is pivotally attached to the platform such that the second periscope is pivoted in line with the optical centers of the second mirror and the third mirror, and such that the third mirror is in optical communication with the second mirror. This device may also further comprise means for pivoting the second periscope through an angle of $\alpha°$ as the platform rotates about its axis of rotation.

This invention also presents a second embodiment of an optical scan device for use in a satellite orbiting the earth. It comprises a first hollow cylinder which has a first diameter and a first central longitudinal axis of first length, and a second hollow cylinder which has a second diameter smaller than the first diameter and a second central longitudinal axis of second length. Means are provided for aligning the first hollow cylinder with the second hollow cylinder such that the first central longitudinal axis and the second central longitudinal axis are colinear to form a common central longitudinal axis. Means are also provided for rotating the first hollow cylinder and the second hollow cylinder in the same direction and at the same rate of speed about the common central longitudinal axis.

Also present in the second embodiment is a first periscope which has a longitudinal axis and a first mirror and a second mirror, and a second periscope which has a longitudinal axis and a third mirror and a fourth mirror. The first periscope is attached inside and to the first hollow cylinder such that the first mirror is positioned with its optical axis coincident with the common central longitudinal axis. The second periscope is pivotally attached inside and to the first hollow cylinder such that the second periscope is pivoted in line with the optical centers of the second mirror and the third mirror, and such that the second mirror is in optical alignment with the third mirror. Means are provided for imparting linear axial motion to the second hollow cylinder, and means further provided for imparting the linear axial motion of the second hollow cylinder to the second periscope such that the linear axial motion is converted to angular motion causing the second periscope to pivot.

A third embodiment of an optical scan device for use in a satellite orbiting the earth is also presented by this invention. It comprises a first hollow cylinder which has a first diameter, a first central longitudinal axis of first length, a first end, and a second end. Also present is a second hollow cylinder having a second diameter smaller than the first diameter, a second central longitudinal axis of second length, a first end, and a second end. The third embodiment further comprises an electric motor having a stator, and a rotor which revolves around an axis of rotation. The rotor has a hollow cylindrical shaft with a central longitudinal axis of third length smaller than the second length running through the rotor such that the axis of rotation of the rotor and the central longitudinal axis of the shaft are colinear. The hollow cylindrical shaft has a diameter large enough for the second hollow cylinder to slidably fit in it, a first end, and a second end. A first set of three axial track grooves spaced 120° apart are dispoed in the outer wall of the second hollow cylinder, and a second set of three axial track grooves spaced 120° apart are disposed in the inner wall of the hollow cylindrical shaft such that they match the first set of three axial track grooves. A first set of ball bearings is disposed in the first matched pair of axial track grooves to form a first linear ball bearing. A second set of ball bearings is disposed in the second matched pair of axial track grooves to form a second linear ball bearing. And a third set of ball bearings is disposed in the third matched pair of axial track grooves to form a third linear ball bearing.

Concentrically attached to the first end of the second hollow cylinder is the inner race of a first torque tube ball bearing. A carrier ring is concentrically attached to the outer race of the first torque tube ball bearing. Also attached to the carrier ring are a ball nut and a ball slide. The ball nut and the ball slide are spaced 180° apart. A lead screw is threaded through the ball nut, and a step motor is attached to one end of the lead screw. Rotation of the lead screw by the step motor causes the ball nut to travel along the lead screw, which imparts linear motion to the second hollow cylinder so that the second hollow cylinder travels linearly through the hollow cylindrical shaft of the rotor. The ball slide is slidably attached to a stabilizer rod. Means are included for attaching the first hollow cylinder to the rotor such that the first central longitudinal axis and the second central longitudinal axis are colinear and such that the second end of the second hollow cylinder extends into the first hollow cylinder. A first periscope is attached inside and to the first hollow cylinder. The first periscope has a first periscope tube with a first end, a second end, and a longitudinal axis. A first mirror is disposed in its first end and a second mirror is disposed in its second end. The first periscope is attached to the first hollow cylinder such that its first mirror is positioned with its optical axis coincident with the axis of rotation of the rotor. Also present is a second periscope which has a second periscope tube with a first end, a second end, and a longitudinal axis, and with a third mirror disposed in the first end of the tube and a fourth mirror disposed in the second end of the tube. Also present is a connecting tube having a central longitudinal axis, a first end, and a second end. Concentrically attached to the first end of the connecting tube is the inner race of a second torque tube bearing. The outer race of the second torque tube bearing is attached to the second end of the first periscope such that the central longitudinal axis of the connecting tube is colinear with the optical axis of the second mirror. The second end of the connecting tube is attached to the first end of the second periscope tube such that the central longitudinal axis of the connecting tube is colinear with the optical axis of the third mirror. An end bearing mount has its inner race attached to the inside of the first hollow cylinder, and the outer race of the end bearing mount is attached to the first end of the second periscope tube such that the second end of the second periscope tube can tilt when the connecting tube is rotated. A gear sector is attached to the connecting tube, and a gear rack is mounted on the outside and at the second end of the second hollow cylinder such that its teeth mesh with the teeth of the gear sector.

The electric motor in the third embodiment of the invention may be a variable speed motor, and means can be included for controlling its speed. Also, the step motor may be a variable speed motor, and means can be included for controlling its speed.

OBJECTS OF THE INVENTION

It is an object of this invention to provide an optical scanning system for use in satellites orbiting the earth.

A further object of this invention is to provide a scanning mechanism which produces a conical scan pattern.

Another object of the invention is to provide a scanning mechanism which eliminates the need for sliding contacts such as motor brushes, grounding brushes for electrostatic noise reduction, slip ring assemblies, and flexible cables.

Another object of the invention is to provide a scanning mechanism which allows for complete and independent freedom of the two scan motions (angular tilt and rotary motion).

DESCRIPTION OF THE PREFERRED EMBODIMENT

Figure 1:
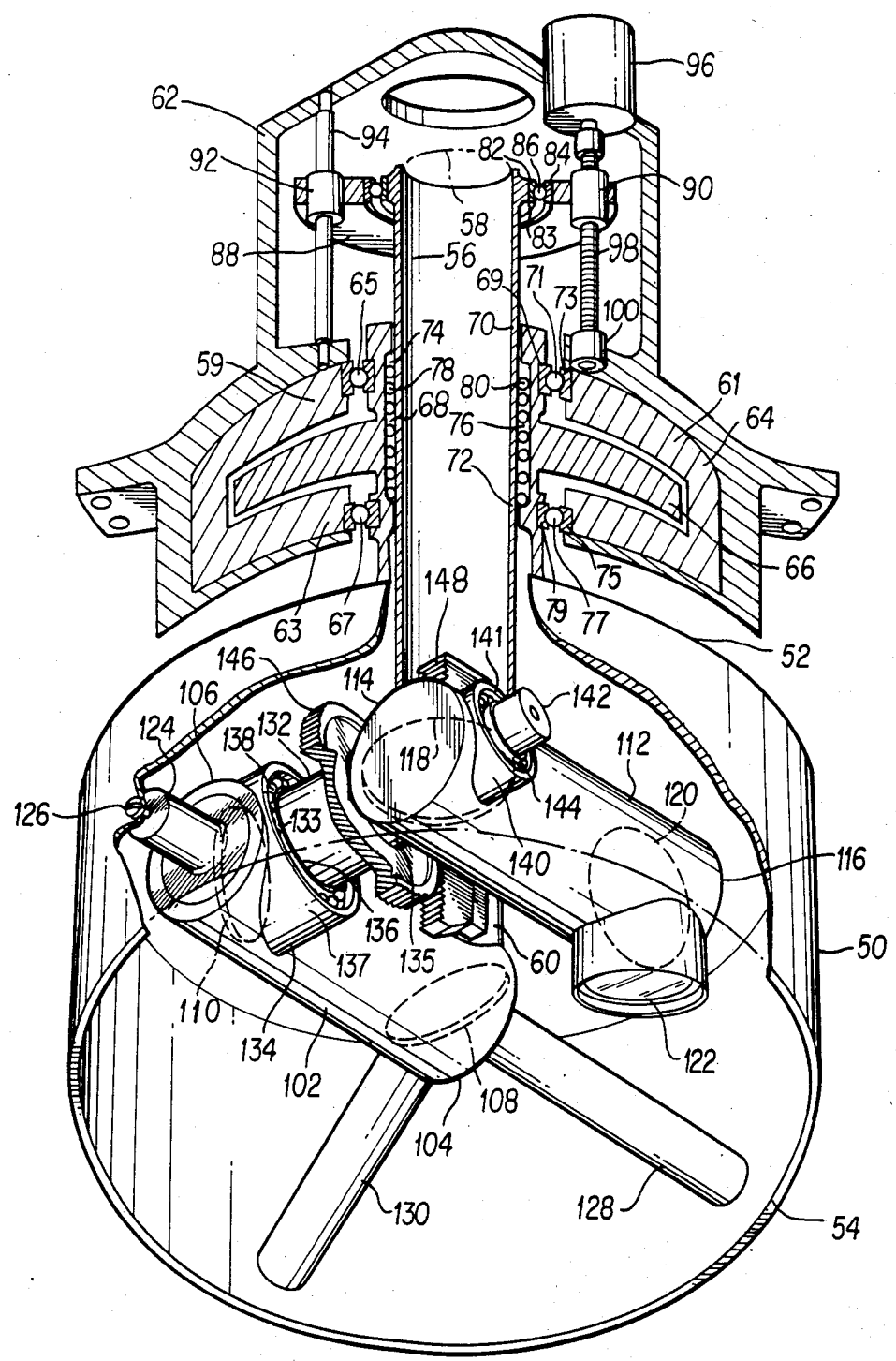
FIG. 1 is a cross-sectional and partial cut-away view of the preferred embodiment of the invention.

The preferred embodiment of the present invention is illustrated in FIG. 1. It comprises a first hollow cylinder 50. Hollow cylinder 50 has a first end 52, a second end 54, a first diameter, and a first central longitudinal axis of first length. The invention also comprises a second hollow cylinder 56. Hollow cylinder 56 has a first end 58, a second end 60, a second diameter smaller than the first diameter, and a second central longitudinal axis of second length.

An electric motor 61 is mounted in case 62. Electric motor 61 comprises a stator 64, a rotor 66, a first motor bearing 65, and a second motor bearing 67. Rotor 66 revolves around an axis of rotation, and it has a hollow cylindrical shaft 68 with a central longitudinal axis of third length smaller than the length of the second central longitudinal axis running through rotor 66 such that the axis of rotation of rotor 66 and the central longitudinal axis of shaft 68 are colinear. Hollow cylindrical shaft 68 has a diameter which is large enough for the second hollow cylinder 56 to slidably fit in it, a first end 70, and a second end 72. First motor bearing 65 comprises an inner race 69 concentrically attached to rotor 66, an outer race 73 concentrically attached to stator 64, and ball bearings 71 disposed between the two races. Second motor bearing 67 comprises an outer race 75 concentrically attached to rotor 66, an inner race 79 concentrically attached to stator 64, and ball bearings 77 disposed between the two races. First motor bearing 65 is disposed at end 59 of motor 61, and second motor bearing 67 is disposed at end 63 of motor 61.

A first set of three axial track grooves spaced 120° apart are disposed in the outer wall of second hollow cylinder 56, and a second set of three axial track grooves 120° apart are disposed in the inner wall of the hollow cylindrical shaft 68 such that they match the first set of three axial track grooves. In FIG. 1, a first pair of axial track grooves is represented by 74, and a second pair of axial track grooves is represented by 76. The third pair of axial track grooves is not illustrated. A first set of ball bearings 78 is disposed in the first pair of axial track grooves 74 such that a first linear ball bearing is formed. A second set of ball bearings 80 is disposed in the second pair of axial track grooves 76 such that a second linear ball bearing is formed. A third set of ball bearings, not illustrated, is disposed in the third pair of axial track grooves such that a third linear ball bearing is formed. The three linear ball bearings provide the necessary key relationship to assure that the second hollow cylinder rotates in unison with the first hollow cylinder, and they minimize friction between the two members upon application of an axial stroke to the second hollow cylinder.

Inner race 82, outer race 84, and a set of ball bearings 86 comprise a first torque tube ball bearing 83. Inner race 82 of the first torque tube ball bearing 83 is concentrically attached to the first end 58 of second hollow cylinder 56. The outer race 84 of the first torque tube ball bearing 83 is concentrically attached to carrier ring 88. Ball bearings 86 are disposed between inner race 82 and outer race 84 of the first torque tube ball bearing 83. Carrier ring 88 is also attached to ball nut 90 and ball slide 92. Ball nut 90 and ball slide 92 are spaced 180° apart around carrier ring 88. The ball slide 92 is slidably attached to stabilizer rod 94. Stabilizer rod 94 is attached at both ends to case 62 and is parallel to second hollow cylinder 56. Stabilizer rod 94 provides additional axial stability. A lead screw 98 is threaded through ball nut 90. Lead screw 98 is also parallel to second hollow cylinder 56. One end of lead screw 98 is attached to step motor 96, and the other end is attached to lead screw mount 100. Both step motor 96 and lead screw mount 100 are attached to case 62. Rotation of lead screw 98 by step motor 96 causes ball nut 90 to travel along lead screw 98. This in turn imparts linear motion to second hollow cylinder 56 which causes it to travel linearly through hollow cylindrical shaft 68 of rotor 66.

The first end 52 of first hollow cylinder 50 is attached to the second end 72 of the hollow cylindrical shaft 68. The two are attached such that the first central longitudinal axis of first hollow cylinder 50 is colinear with the second central longitudinal axis of second hollow cylinder 56, and such that the second end 60 of second hollow cylinder 56 extends into first hollow cylinder 50. Since second hollow cylinder 56 is connected to carrier ring 88 through first torque tube bearing 83, it can rotate freely in unison with first hollow cylinder 50.

The invention further comprises a first periscope tube 102 which has a first end 104, a second end 106, and a longitudinal axis. A first mirror 108 is disposed in first end 104, and a second mirror 110 is disposed in its second end 106. Also present is a second periscope tube 112 which has a first end 114, a second end 116, and a longitudinal axis. A third mirror 118 is disposed in its first end 114, and a fourth mirror 120 is disposed in its second end 116. A viewport 122 is attached to the second end 116 of second periscope tube 112. Viewport 122 is in optical communication with fourth mirror 120, and it is positioned so that it views the area of the earth to be scanned. The first periscope 102 is attached inside and to first hollow cylinder 50 by means of mounts 124, 128, and 130 such that first mirror 108 is positioned with its optical axis coincident with, and in optical communication with, the axis of rotation of rotor 66. Screw 126 is used to attach mount 124 to first hollow cylinder 50.

A connecting tube 132 connects the first periscope 102 with the second periscope 112. The connecting tube 132 has a central longitudinal axis, a first end 133 and a second end 135. Concentrically attached to the first end 133 of connecting tube 132 is the inner race 136 of second torque tube bearing 137. The outer race 134 of second torque tube bearing 137 is attached to the second end 106 of first periscope tube 102 such that the central longitudinal axis of connecting tube 132 is colinear with the optical axis of second mirror 110, and such that connecting tube 132 is in optical communication with second mirror 110. Ball bearings 138 are disposed between outer race 134 and inner race 136 of second torque tube bearing 137. The second end 135 of connecting tube 132 is directly attached to the first end 114 of second periscope tube 112 such that the central longitudinal axis of the connecting tube 132 is colinear with the optical axis of third mirror 118, and such that connecting tube 132 is in optical communication with third mirror 118. Also attached to the first end 114 of second periscope tube 112 is the outer race 140 of end bearing mount 141. The inner race 142 of end bearing mount 141 is attached to the inside of first hollow cylinder 50. End bearing mount 141 supports second periscope tube 112 and it allows it to tilt when connecting tube 132 is rotated. Ball bearings 144 are disposed between outer race 140 and inner race 142 of end bearing mount 141.

A gear sector 146 is attached to connecting tube 132. A gear rack 148 is mounted on the outside and at the second end 60 of second hollow cylinder 56 such that its teeth mesh with the teeth of gear sector 146. Connecting tube 132 rotates in response to the linear motion of second hollow tube cylinder 56, which is caused by step motor 96 rotating lead screw 98. The rotation of connecting tube 132 is caused by gear rack 148 driving gear sector 146. This in turn causes the second periscope tube 112 to pivot through an angle of α degrees. The rotary motion (β) of rotor 66, of first hollow cylinder 50, and of second hollow cylinder 56 is independent of the angular or tilting motion of second periscope tube 112.

The step motor-lead screw combination in conjunction with the rack and gear combination provides an ideal linear step actuator. The rotary motion of the step motor is converted to linear or axial motion by the lead screw ball nut outside the rotating first hollow cylinder and is transmitted by the second hollow cylinder to the inside of the first hollow cylinder. A reconversion to angular motion is then effected inside the first hollow cylinder by the rack gear drive and it is directly applied to the second, tilting periscope.

The magnitude of the linear stroke motion of second hollow cylinder 56 is a function of the gear sector pitch radius and the desired tilt angle. It is determined by the following equation:

$$S_l = \frac{2R_p \pi}{(360/\alpha)} \quad [1]$$

where:
$S_l$ = Linear stroke,
$R_p$ = Gear sector pitch radius, and
$\alpha$ = angular periscope displacement (tilt angle) in degrees.

If, for example, a gear with a one-inch pitch radius is selected and the angular displacement (tilt angle, $\alpha$) is assumed to be 60° maximum, and if the angular displacement is to be advanced in 10 discrete step increments of 6° each, then the maximum stroke is 1.0472 inches per 60°, or about 0.105 inch per each 6° increment. Further, assuming that a 200 step/revolution motor with a 1/5 pitch lead screw could be used as an actuator, then the linear index for each discrete 1.8° step that the motor advances would be about 0.001 inch. Thus, about 105 individual motor steps (or 189° step motor rotation) would be required for each 6° of tilt angle displacement. However, any suitable combination can be used as long as the actual requirements and the specified response times can be met. The linear displacement or stroke values can be derived from the following equation:

$$S_l = \frac{(360/\Phi)^{-1}}{L_p} \quad [2]$$

where:
$S_l$ = Linear displacement (stroke),
$\Phi$ = Motor step angle in degrees, and
$L_p$ = Lead screw pitch.

Figure 2:
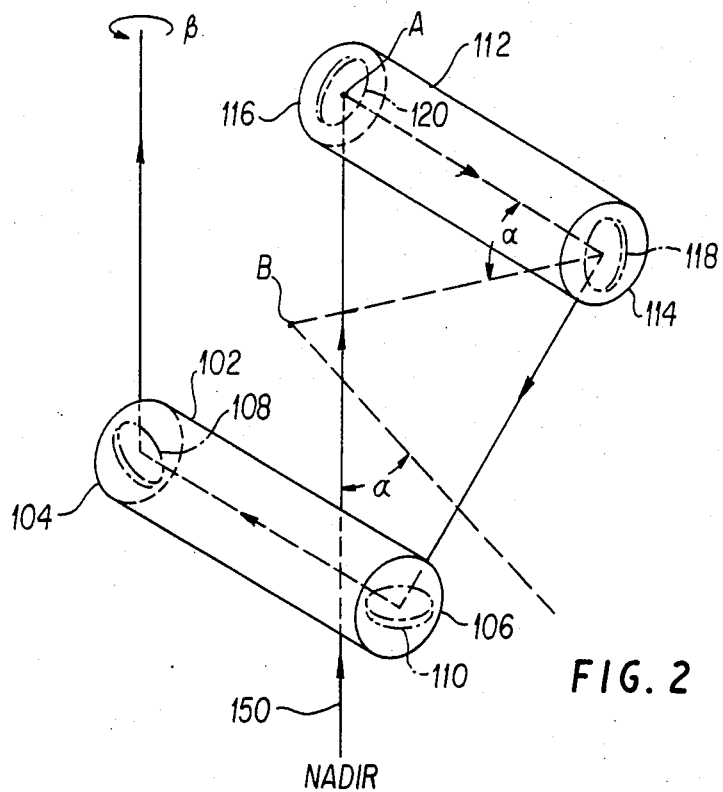
FIG. 2 is a schematic of the scan optics.
Figure 3:
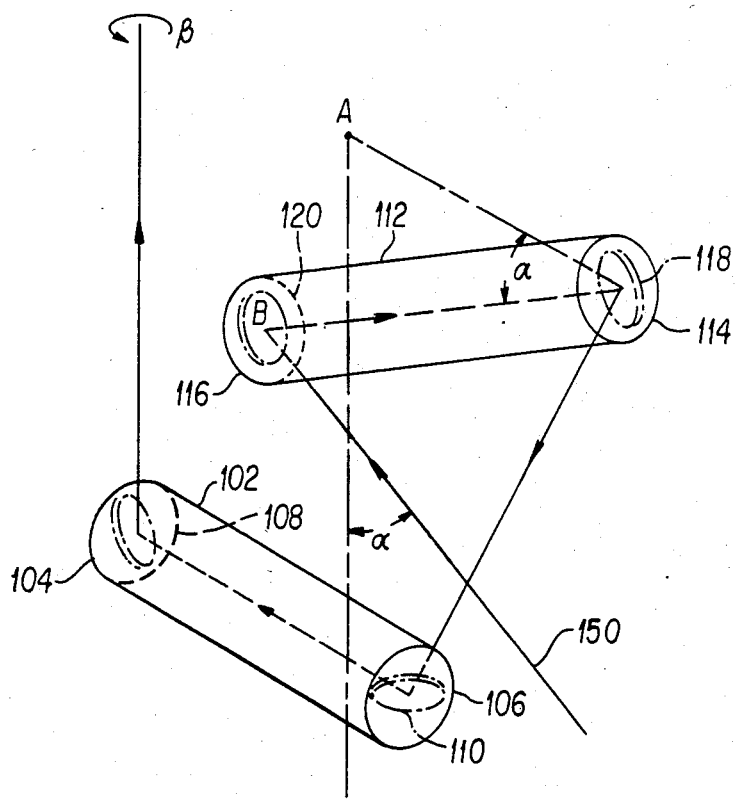
FIG. 3 is a schematic of the scan optics.
Figure 4:
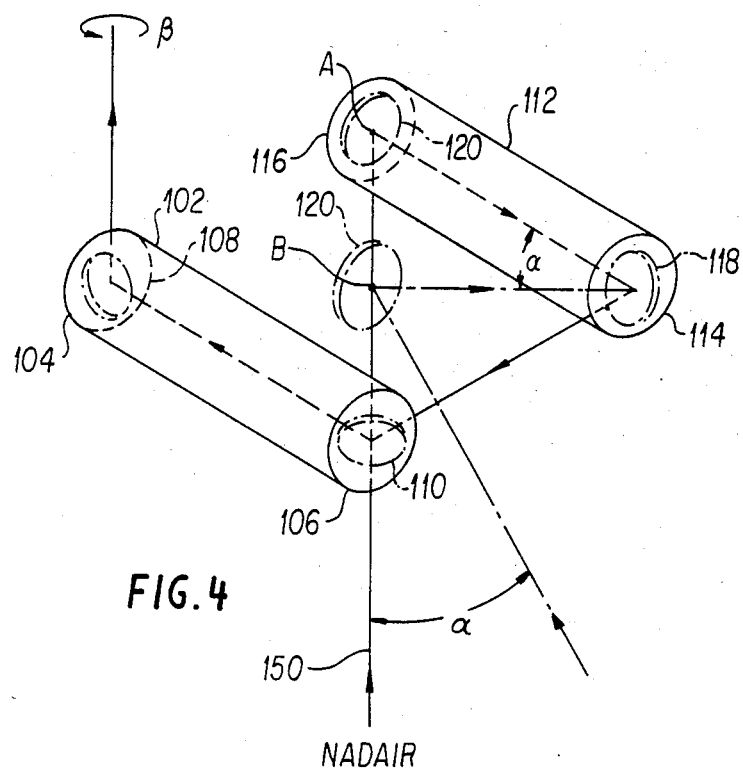
FIG. 4 is a schematic of the scan optics.

FIGS. 2, 3, and 4 are schematics of the scan optics. Each figure shows first periscope tube 102, second periscope tube 112, first end 104 of first periscope tube 102, second end 106 of first periscope tube 102, first end 114 of second periscope tube 112, second end 116 of second periscope tube 112, first mirror 108, second mirror 110, third mirror 118, and fourth mirror 120. The arrangement of the four mirrors is in the form of two beam-twisting periscopes which compensates for the dependence of the optics to the plane of polarization of incident, partially polarized radiation. FIG. 2 shows second periscope tube 112 at the highest elevation of tilt angle α, which is represented by point A. FIG. 3 shows second periscope tube 112 at the lowest elevation of tilt angle α, which is represented by point B. FIG. 4 shows the two extreme positions of second periscope tube 112 superimposed on each other, except that second periscope tube 112 has been drawn only once.

FIG. 2 shows that when second periscope tube 112 is at point A, mirror 120 is pointing vertically downward toward the earth, as shown by light beam 150. This is the nadir position. FIG. 3 shows that when second periscope tube 112 is at point B, mirror 120 is pointing α° away from the nadir, as shown by the position of light beam 150. FIGS. 2, 3, and 4 also show that first mirror 108 is positioned with its optical axis coincident with the rotating scanning axis, which is the axis of rotation of rotor 66, as shown by β. If the scanning starts in the center, as shown by the nadir position, the circular pattern traced will increase in diameter with each rotation. The volume swept out during rotation is a cone. This type of pattern is referred to as a conical scan. In each of the drawings, beam 150 is ultimately directed to sensing means, not shown.

Figure 5:
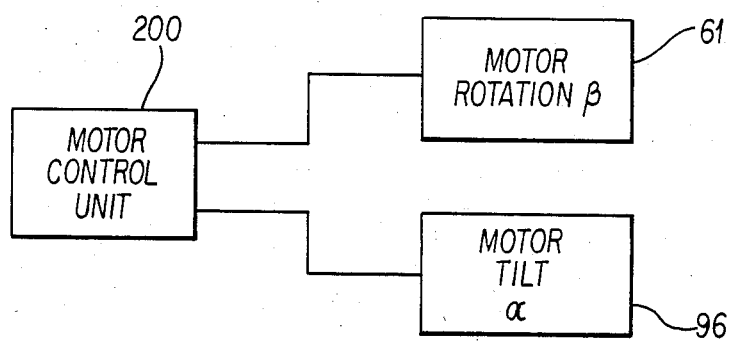
FIG. 5 is a block diagram of the motor control circuitry.

In the preferred embodiment motor 61 should be variable speed motor, such as a variable speed DC motor. A variable speed motor is needed since the scan pattern consists essentially of a series of circular sweeps, with each new sweep different in diameter than the previous one. In order to maintain constant sweep velocity over the surface of the earth for all sweep diameters, the rotational velocity of rotor 66 of motor 61 must be increased or decreased proportionally to each discrete change in sweep diameter. This requirement cannot be met by a single speed or synchronous motor. A standard motor control unit, as shown by 200 in FIG. 5, can be used to control the velocity of rotor 66. To meet the required accuracy and stability criteria for tilt angle control, the standard motor control unit 200 could control the angular position of lead screw 98 of step motor 96.

Because of the unusual flexibility which this scanning mechanism offers within its design parameters, diverse scan modes can be obtained and different scan patterns can be generated. It is, for instance, possible to apply unrestricted bi-directional rotation as oscillations. A quick reset to the starting position is possible with this mechanism, as well as continuing rotation in either direction. The tilt angle periscope can be operated and controlled independently of the rotating β motion to generate two axis or cross-axis scan patterns. A scan can be repeated or skipped if needed. Other combinations and variations are also possible.

While the invention has been described to make reference to the accompanying drawings, I do not wish to be limited to the details shown therein as obvious modifications may be made by one of ordinary skill in the art.

I claim:

1. An optical scan device for use in a satellite orbiting the earth comprising:
   a platform rotating about an axis;
   a first periscope having a longitudinal axis and first and second mirrors, and being attached to said platform such that said first mirror is positioned with its optical axis coincident with the axis of rotation of said platform; and
   a second periscope having a longitudinal axis and third and fourth mirrors, and being pivotally attached to said platform such that said second periscope is pivoted in line with the optical centers of said second mirror and said third mirror, and such that said third mirror is in optical communication with said second mirror, wherein said third and fourth mirrors are located at opposite ends of said second periscope, and wherein said fourth mirror is in optical communication with said third mirror.

2. The device of claim 1 further comprising means for pivoting said second periscope through an angle α as said platform rotates about its axis of rotation.

3. An optical scan device for use in a satellite orbiting the earth comprising:
   a first hollow cylinder having a first diameter and a first central longitudinal axis of first length;
   a second hollow cylinder having a second diameter smaller than said first diameter and a second central longitudinal axis of second length;
   means for aligning said first hollow cylinder with said second hollow cylinder such that said first central longitudinal axis and said second central longitudinal axis are colinear such that common central longitudinal axis is formed;
   means for rotating said first hollow cylinder and said second hollow cylinder in the same direction and at the same rate of speed about the common central longitudinal axis;
   a first periscope having a longitudinal axis and a first mirror and a second mirror;
   a second periscope having a longitudinal axis and a third mirror and a fourth mirror;
   said first periscope being attached inside and to said first hollow cylinder such that said first mirror is positioned with its optical axis coincident with the common central longitudinal axis;
   said second periscope being pivotally attached inside and to said first hollow cylinder such that said second periscope is pivoted in line with the optical centers of said second mirror and said third mirror, and such that said second mirror is in optical alignment with said third mirror, wherein said third and fourth mirrors are located at opposite ends of said second periscope, and wherein said fourth mirror is in optical communication with said third mirror;
   means for imparting linear axial motion to said second hollow cylinder; and
   means for imparting the linear axial motion of said second hollow cylinder to said second periscope such that said linear axial motion is converted to angular motion.

4. An optical scan device for use in a satellite orbiting the earth comprising:
   a first hollow cylinder having a first diameter, a first central longitudinal axis of first length, a first end, and a second end;
   a second hollow cylinder having a second diameter smaller than said first diameter, a second central longitudinal axis of second length, a first end, and a second end;
   an electric motor having a stator, and a rotor which revolves around an axis of rotation, said rotor having a hollow cylindrical shaft with a central longitudinal axis of third length smaller than said second length running through said rotor such that the axis of rotation of said rotor and the central longitudinal axis of said shaft are colinear, and said hollow cylindrical shaft having a diameter large enough for said second hollow cylinder to slidably fit in it, a first end, and a second end;
   a first set of three axial track grooves spaced 120° apart and disposed in the outer wall of said second hollow cylinder;
   a second set of three axial track grooves spaced 120° apart and disposed in the inner wall of said hollow cylindrical shaft such that they match said first set of three axial track grooves;
   a first set of ball bearings disposed in a first matched pair of axial track grooves such that a first linear ball bearing is formed;

a second set of ball bearings disposed in a second matched pair of axial track grooves such that a second linear ball bearing is formed;

a third set of ball bearings disposed in a third matched pair of axial track grooves such that a third linear ball bearing is formed;

a first torque tube ball bearing having an inner race and an outer race;

said inner race of said first torque tube ball bearing being concentrically attached to the first end of said second hollow cylinder;

a carrier ring;

a ball nut;

a ball slide;

a stabilizer rod;

said carrier ring is concentrically attached to said outer race of said first torque tube ball bearing, to said ball nut, and to said ball slide such that said ball nut and said ball slide are 180° apart;

a step motor;

a lead screw attached to said step motor and threaded through said ball nut such that the rotation of said lead screw causes said ball nut to travel along said lead screw imparting linear motion to said second hollow cylinder so that said second hollow cylinder travels linearly through the hollow cylindrical shaft of said rotor;

said ball slide is slidably attached to said stabilizer rod;

means for attaching said first hollow cylinder to said rotor such that said first central longitudinal axis and said second central longitudinal axis are colinear and such that the second end of said second hollow cylinder extends into said first hollow cylinder;

a first periscope having a first periscope tube with a first end, a second end, and a longitudinal axis, and with a first mirror disposed in its first end and a second mirror disposed in its second end;

a second periscope having a second periscope tube with a first end, a second end, and a longitudinal axis, and with a third mirror disposed in its first end and a fourth mirror disposed in its second end;

said first periscope being attached inside and to said first hollow cylinder such that said first mirror is positioned with its optical axis coincident with the axis of rotation of said rotor;

a connecting tube having a central longitudinal axis, a first end, and a second end;

a second torque tube bearing having an inner race and an outer race;

an end bearing mount having an outer race and an inner race;

a gear sector;

a gear rack;

said inner race of said second torque tube bearing being concentrically connected to the first end of said connecting tube;

said outer race of said second torque tube bearing being attached to the second end of said first periscope tube such that the central longitudinal axis of said connecting tube is colinear with the optical axis of said second mirror;

said second end of said connecting tube being attached to the first end of said second periscope tube such that the central longitudinal axis of the connecting tube is colinear with the optical axis of said third mirror;

said inner race of said end bearing mount being attached to the inside of said first hollow cylinder and said outer race of said end bearing mount being attached to the first end of said second periscope tube such that the second end of said second periscope tube can tilt when said connecting tube is rotated;

said gear sector being attached to said connecting tube; and said gear rack being mounted on the outside and at the second end of said second hollow cylinder such that its teeth mesh with the teeth of said gear sector.

5. The device of claim 4 wherein said electric motor is a variable speed motor.

6. The device of claim 5 further comprising means for controlling the speed of said variable speed motor.

7. The device of claim 6 wherein said step motor is a variable speed step motor.

8. The device of claim 7 further comprising the means for controlling the speed of said variable speed step motor.

* * * * *